(12) United States Patent
Uppala et al.

(10) Patent No.: US 8,364,699 B2
(45) Date of Patent: Jan. 29, 2013

(54) COMMODITIES FRAMEWORK

(75) Inventors: Sudhaker Uppala, Edison, NJ (US);
Matthew R. White, Randolph, NJ (US);
Subra Minnal, Plainsboro, NJ (US);
Rossen Stoyanchev, New York, NY (US)

(73) Assignee: Morgan Stanley, New York, NY (US)

( * ) Notice: Subject to any disclaimer, the term of this patent is extended or adjusted under 35 U.S.C. 154(b) by 334 days.

(21) Appl. No.: 12/618,459

(22) Filed: Nov. 13, 2009

(65) Prior Publication Data

US 2010/0217772 A1 Aug. 26, 2010

Related U.S. Application Data

(60) Provisional application No. 61/114,882, filed on Nov. 14, 2008.

(51) Int. Cl.
*G06F 7/00* (2006.01)
(52) U.S. Cl. .................................................. 707/769
(58) Field of Classification Search .................. None
See application file for complete search history.

(56) References Cited

U.S. PATENT DOCUMENTS

| | | | |
|---|---|---|---|
| 5,398,312 A | 3/1995 | Hoffmann | |
| 5,831,611 A | 11/1998 | Kennedy et al. | |
| 6,710,782 B2 | 3/2004 | Ruff et al. | |
| 6,839,680 B1 | 1/2005 | Liu et al. | |
| 7,739,310 B1* | 6/2010 | Shmulevich et al. | 707/802 |
| 2002/0169852 A1* | 11/2002 | Schaeck | 709/218 |
| 2003/0101449 A1 | 5/2003 | Bentolila et al. | |
| 2003/0149722 A1* | 8/2003 | Jolley et al. | 709/203 |
| 2003/0160822 A1 | 8/2003 | Belz et al. | |
| 2003/0167315 A1* | 9/2003 | Chowdhry et al. | 709/218 |
| 2003/0187956 A1* | 10/2003 | Belt et al. | 709/219 |
| 2004/0010598 A1* | 1/2004 | Bales et al. | 709/228 |
| 2004/0221261 A1* | 11/2004 | Blevins | 717/107 |
| 2005/0198201 A1* | 9/2005 | Bohn et al. | 709/218 |
| 2006/0031377 A1* | 2/2006 | Ng et al. | 709/208 |
| 2006/0107314 A1 | 5/2006 | Cataldi | |
| 2006/0136587 A1* | 6/2006 | Allamaraju et al. | 709/224 |
| 2007/0038946 A1 | 2/2007 | Grieshaber et al. | |

(Continued)

OTHER PUBLICATIONS

Weinreich et al. "A Component Model for Integrating Remote Applications and Services via Web Portals," 2007, ETH Zurich, Journal of Object Technology, vol. 6, No. 8, Sep.-Oct. 2007, pp. 67-94.*

(Continued)

*Primary Examiner* — Debbie Le
*Assistant Examiner* — Richard Bowen
(74) *Attorney, Agent, or Firm* — K&L Gates LLP

(57) ABSTRACT

Various embodiments are directed to methods and systems for presenting an interface to a user. For example, a computer may receive a request for content originating from a browser application executing on a client machine in electronic communication with the at least one server. The request may identify a first commodity and a first event associated with the commodity and may comprise a Universal Resource Locator (URL) identifying the first commodity. The computer may parse a commodity descriptor file to identify a first service associated with the first commodity and the first event. The commodity descriptor file may comprise definitions of a plurality of commodities and wherein the plurality of commodities comprises the first commodity. In addition, the computer may generate a service call requesting the first service, and execute the at least one service associated with the first commodity and the first event. The at least one service may query the data source to retrieve data describing the commodity and construct a model of the commodity according to the data.

28 Claims, 11 Drawing Sheets

U.S. PATENT DOCUMENTS

| | | | |
|---|---|---|---|
| 2007/0209006 A1* | 9/2007 | Arthurs et al. | 715/733 |
| 2008/0016151 A1* | 1/2008 | Howard et al. | 709/203 |
| 2008/0077851 A1* | 3/2008 | Hesmer et al. | 715/234 |
| 2008/0126176 A1 | 5/2008 | Iguchi | |
| 2008/0281898 A1* | 11/2008 | Pesce et al. | 709/201 |
| 2008/0288955 A1* | 11/2008 | Brockway et al. | 719/311 |
| 2009/0006578 A1* | 1/2009 | Schaeck | 709/217 |
| 2009/0063502 A1* | 3/2009 | Coimbatore et al. | 707/10 |
| 2009/0100372 A1* | 4/2009 | Lauridsen et al. | 715/781 |
| 2009/0249287 A1* | 10/2009 | Patrick | 717/107 |
| 2009/0259631 A1* | 10/2009 | Farrell et al. | 707/3 |
| 2009/0320119 A1* | 12/2009 | Hicks et al. | 726/9 |
| 2010/0070871 A1* | 3/2010 | Liesche et al. | 715/744 |
| 2010/0121879 A1* | 5/2010 | Greenberg | 707/779 |

OTHER PUBLICATIONS

A. Akram, D. Chohan, X.D. Wang, X. Yang and R. Allan, "A Service Oriented Architecture for Portals Using Portlets," 2005 UK e-Science AHM2005, Nottingham, UK, 2005.*

Wege, Portal Server Technology, 2002, IEEE, IEEE Internet Computing, May-Jun. 2002, pp. 73-77.*

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining", Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; ONLINE http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

Talent Directory

Find by [Name or Login ID or Phone ▾]　Feedback & Suggestions [        ]

| SEARCH TALENT | MY PROFILE | FIRMWIDE DIRECTORY | ADMIN | HELP |

Skills & Expertise

▸ Skills & Expertise
▸ Manager & Reports
▸ Work Experience
▸ Bio
▸ Links

🖧 View Org Chart

Is your info up to date?
Last update: 05 May 2008
1,783 people have looked at your page
Click the Update button to update each of your sections

John P. Smith
Vice President, Technical Lead
Technology, APP SRV Group
① ☎ 1-555-555-5555　✉ See Firmwide Directory Page

[ Commodity ]

Role　☑ Update
Primary Role　Technical Lead
Responsibilities　Tech Lead for Talent Directory
*Role & description not verified by the firm*

Rolls & Expertise.　☑ Update
*These are Skills I have, Departments or Divisions I have worked with or covered, and Regions, Industries, or Policies I have expertise with.*

| Skill/Expertise | Expertise | Category |
|---|---|---|
| Java | <1 Year / Beginner | Skill > Technology > Development |
| Java Script | <1 Year / Beginner | Skill > Technology > Development |
| Oracle | <1 Year / Beginner | Skill > Technology > Database |
| Technical Documentation | <1 Year / Beginner | Skill > Analysis & Modeling > Business |

[ Commodity ]

*Information supplied by user and has not been verified by the firm*

Education　☑ Update
*Click a school to see who else went there or click Update to change what you wish to show.*

| School/University | Degree | Major | Minor | Location |
|---|---|---|---|---|
| J.H. Engineering College | Master of Science | Engineering | | India |

[ Commodity ]

Certifications & Licenses　☑ Update
*Click Update to add your Certifications (such as Accredited Financial Examiner or Microsoft Certified Systems Engineer).*

[ Commodity ]

Languages　☑ Update
*Click Update to update your Languages.*

| Languages | | Speaking Level | Reading Level | Writing Level |
|---|---|---|---|---|
| Hindi | Can Translate to / from English | Medium | Medium | Medium |
| Telugu | | Excellent | Excellent | Excellent |

[ Commodity ]

*Information supplied by user and has not been verified by the firm.*

FIG. 1

COMMODITIES FRAMEWORK

PRIORITY CLAIM

This application claims the benefit of U.S. Provisional Application Ser. No. 61/114,882 filed on Nov. 14, 2008, which is incorporated herein by reference in its entirety.

BACKGROUND

Modern web applications may be built using a number of different techniques. For example, many web applications are based on a "page concept" in which a web server renders one web page at a time for viewing via a client browser window. A more flexible approach for presenting content utilizes portals. A portal is a web application that aggregates content from different portlet applications within a single web page. A portlet application, or portlet, is a pluggable user interface software component that produces fragments of markup code and is visibly contained within a portlet window of the portal application. Examples of content provided by portlets include, for example, e-mail, weather reports, discussion forums and news. In addition to content aggregation, portals typically provide a greater degree of personalization and a single sign-on for accessing all of the portal content of a web page.

Portal development and deployment may entail increased complexity and cost, however. In many cases, for example, it is necessary to add one or more separate portal servers to the underlying server infrastructure. Additionally, the need to comply with specialized standards and protocols (e.g., the JSR 168 or JSR 286 Java Portlet Specifications, Web Services for Remote Portlets (WSRP)) generally requires a greater level of development and maintenance expertise and longer development times. The use of specialized standards and protocols may also limit the types of applications able to consume portlet content and the flexibility to present the content in a number of formats. Although browser-based alternatives for providing portal-like features are known (e.g., meshing), such solutions are typically unrefined and may not provide sufficient granularity.

SUMMARY

This application is directed generally and in various embodiments to a web-based architecture for developing and deploying standalone pluggable web components that are accessible individually or in the aggregate.

FIGURES

Various embodiments of the present invention are described here by way of example in conjunction with the following figures, wherein:

FIG. 1 illustrates a web page profile according to one embodiment.

DESCRIPTION

Embodiments of the present application are directed generally to a web-based architecture for developing and deploying logical and self-contained pieces of information, hereinafter referred to as "commodities." A commodity is a standalone pluggable web component that is be declaratively defined using XML or a similar language and is accessible via a unique URL. A commodity is thus modular and may be similar in certain respects to a portlet. For example, a commodity may be combinable with one or more other commodities within a template-based container to define a fully integrated web page. Unlike a portlet, however, a commodity need not be associated with a container. For example, a commodity may have a unique URL such that the commodity may be directly accessed and manipulated independently from a container (e.g., as XML data, for example). In this way, depending upon the needs of a particular client, a commodity may be selectively rendered in a graphical form (e.g., HTML or Flex) or as data (e.g., XML). Additionally, accessing and displaying commodities, either individually or in the aggregate via containers, can be performed using conventional Java-based web server technologies without a need for portal servers and associated standards and protocols.

In the present application, aspects of an architectural framework for developing and deploying commodities (the "commodity framework") are described by way of example in conjunction with a "talent directory" application that may be used within a business setting. In one embodiment, for example, the talent directory application may provide a web page profile for each employee in which an employee's talents (e.g., employee skills, attributes, areas of specialization) and inter-organizational relationships are represented as an aggregation of separate commodities. The talent directory application may be searchable based on one or more specified talents, and may respond to a search query with web page profiles of employees having at least one of the queried talents or relationships.

FIG. 1 illustrates one embodiment of a web page profile 5 displayable by a client of the talent directory application. As shown, the web page profile 5 is defined by a template-based aggregation 10 of various business-related commodities 15. The commodities 15 may include, for example, a Business Card commodity, a Role commodity, a Skills and Expertise commodity, an Education commodity, a Certifications and Licenses commodity, and a Languages commodity. In addition to being accessible to other employees, each web page profile 5 may be accessed and changed by the profiled employee to, for example, update or delete existing content displayed in commodities and/or to add to content displayed in commodities. The web page profile 5 is a container-based representation of the commodities, as discussed below.

Figure 2:
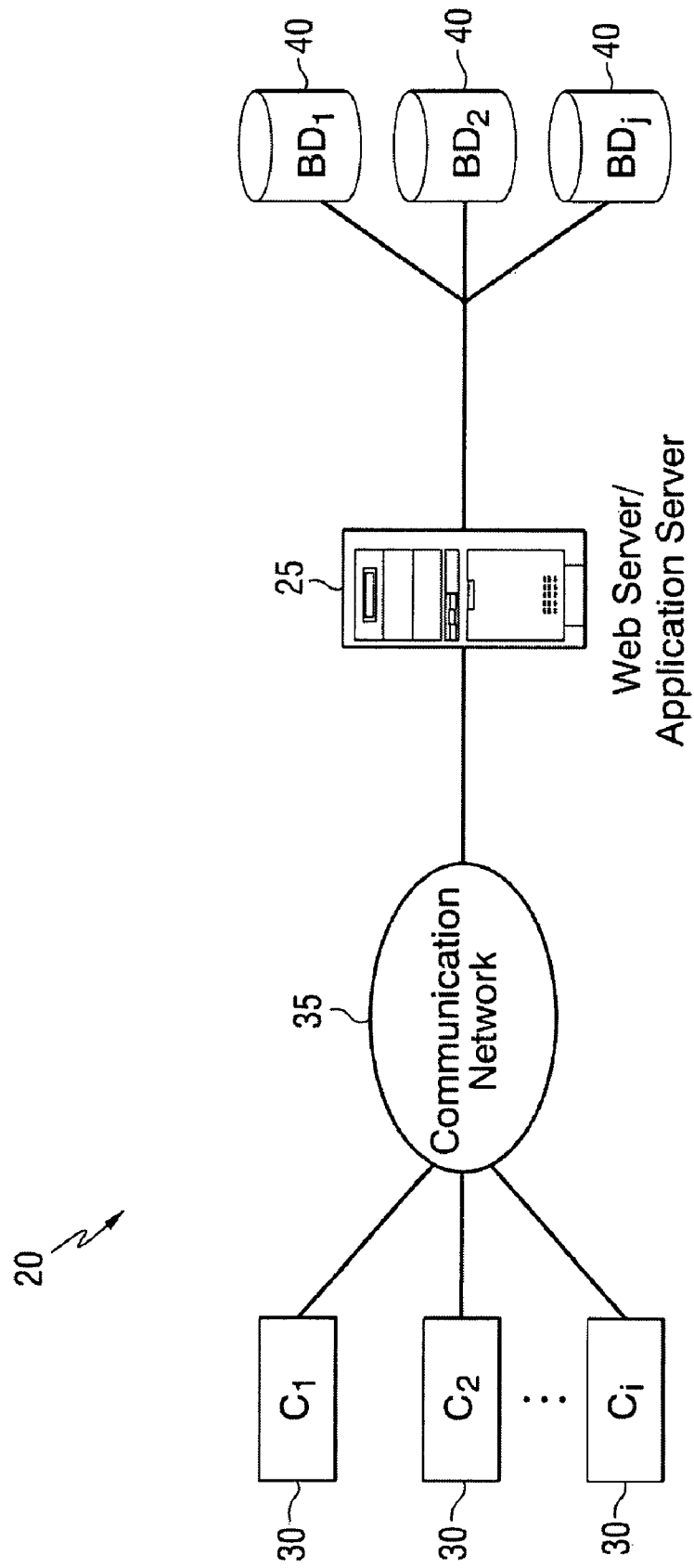
FIG. 2 illustrates a physical system architecture according to one embodiment.

FIG. 2 illustrates a physical architecture of a system 20 for implementing the talent directory application according to one embodiment. The system 20 may include a web server/application server 25 for responding to requests received from one or more clients 30 via a communication network 35. For example, the server 25 may be configured to accept requests for information (e.g., HTTP requests) from one or more of the clients 30 (e.g., PCs and/or other network-enabled devices associated with users) via the communication network 35 and to provide suitable responses thereto. The responses may include, for example, HTTP responses containing one or more documents in a suitable viewing format, such as, for example, an HTML format or a JSP format (e.g., for viewing web page profiles) or an XML/XSL format (e.g., for viewing data corresponding to a particular commodity). The server 25 may include a suitable operating system (e.g., Linux) and, in certain embodiments, is deployed with a Java-based web server environment such as, for example, Apache Tomcat. Although only one server 25 is shown, it will be appreciated that the system 20 may instead comprise multiple servers. In one embodiment, for example, the system 20 may comprise two servers, with a first server configured to deploy static content (e.g., JavaScript, styles, images, HTML files), and a second server configured to deploy dynamic content (e.g., JSP, Servlets). In such embodiments, for example, the first server may be deployed on Apache HTTP server, and the second server may be deployed on Apache Tomcat. According to various embodiments, the Apache Tomcat server may be implemented on a different machine positioned logically behind that of the Apache HTTP server. In this way, an extra level of security may be provided for the Apache Tomcat server as it may be farther removed from a system firewall. Also, in the event that the Apache Tomcat server is down, the system may retain some functionality via the Apache HTTP server. Generally, the communication network 35 may include a public communication network (e.g., the Internet) and/or a private communication network (e.g., a company intranet) suitable for enabling the exchange of information between the server 25 and the clients 30.

In certain embodiments, the server 25 may be configured to communicate with one or more data sources 40 (e.g., databases) storing data to be accessed by the talent directory application. The data sources 40 may contain, for example, data describing content for populating container and/or commodity-based documents. For example, in the context of a talent directory, the data sources 40 may comprise personal and professional information relating to each employee described by the talent directory Such information may include, for example, employee name, contact details, education, work experience, organizational role, hierarchical position, and e-mail group membership. Accordingly, data requested by the talent directory application may be retrieved from one or more of the data sources 40 by the server 25 for incorporation into a commodity 15, for example. The server 25 may include any suitable data server product (e.g., DB2) to support such database functionalities. Although database functionalities are described herein as being implemented by the web server 25, it will be appreciated that in other embodiments such functionalities may instead be implemented using one or more dedicated database servers or any data source such as, for example, one or more Lightweight Directory Access Profile (LDAP) connectors, a search engine, etc. The data source may be in communication with, but, in various embodiments, may be physically separate from, the server 25.

Figure 2A:
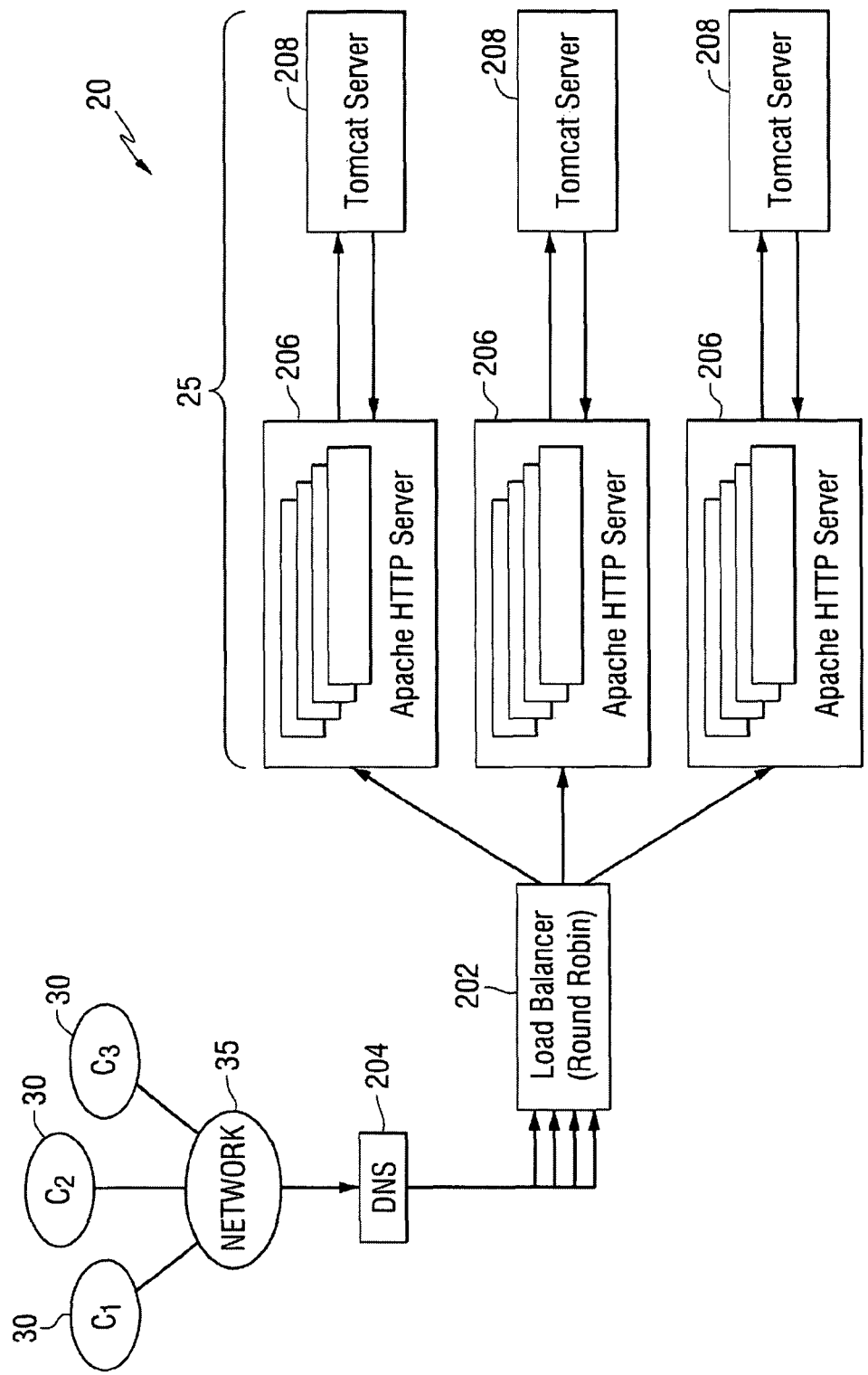
FIG. 2A illustrates one embodiment of the physical system architecture of FIG. 2.

FIG. 2A illustrates one embodiment of the physical system architecture 20 of FIG. 2. As illustrated in FIG. 2A, the functionality of the server 25 may be spread across multiple static content servers 206 (e.g., Apache HTTP servers) and dynamic content servers 208 (e.g., Apache Tomcat servers). The servers 206, 208 may be spread across multiple geographic locations. Each geographic location may comprise local versions of system data sources 40. For each data source type, one geographic location may comprise a primary data source while the other geographic locations may comprise mirror data sources. A domain name server (DNS) may receive incoming content requests. A load balancer 202 may route each incoming request to the appropriate server 206, 208. A server 206, 208 may be selected for a request based on its capabilities, geographic location, and level of congestion.

Figure 3:
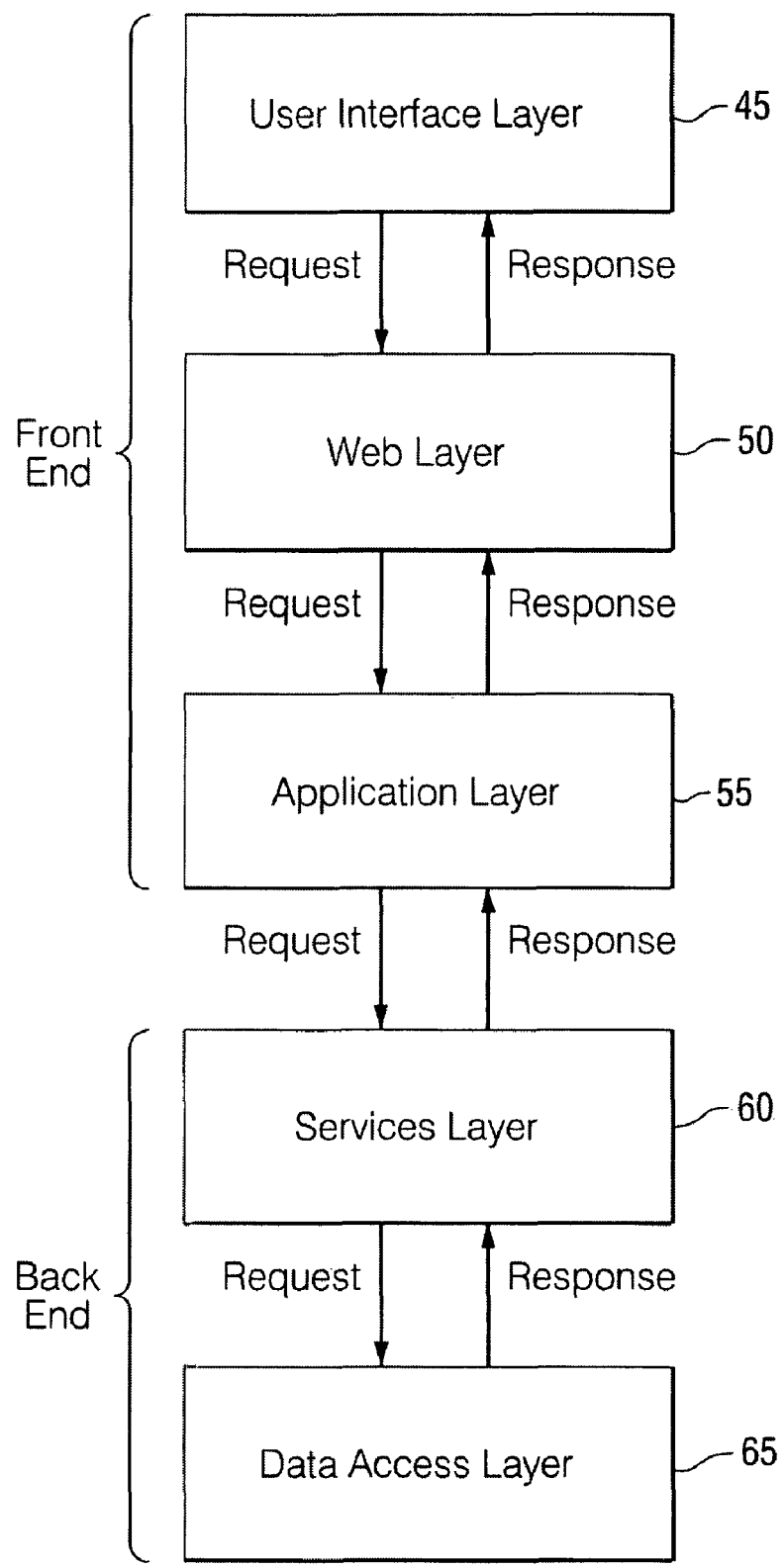
FIG. 3 illustrates a logical architecture of the server of FIG. 2 according to various embodiments.

FIG. 3 illustrates a logical architectures of the server 25 of FIG. 2 according to various embodiments. As shown, the logical architecture may include a user interface layer 45, a web layer 50, an application layer 55, a services layer 60, and a data access layer 65. The user interface layer 45, web layer 50, and application layer 55 collectively define a front end of the server architecture, and the services and data access layers 60, 65 define a back end of the server architecture.

The user interface layer 45 may process requests received from clients 30 (e.g., HTTP requests) and route the requests to the web layer 50 using the appropriate format. Corresponding responses received from the web layer 50 are in turn processed by the user interface layer 45 and returned to the client 30. In certain embodiments, processing the responses includes conforming responses to browser requirements of a particular client 30. In one embodiment, for example, if the client's browser language is English and the client is a PC-based device, the response may be rendered in English using HTML. The user interface layer 45 may be configured to present documents represented by the response in any suitable format, such as, for example, JSP, XML and HTML. The user interface layer 45 may also be configured to control aspects of document presentation using, for example, cascading style sheets (CCS) and/or templating framework (e.g., Tiles). Additionally, the user interface layer 45 may support JavaScript functionality. According to various embodiments, the user interface layer 45 may be implemented in any suitable building framework including, for example, rich content frameworks such as Flex, MICROSOFT SILVERLIGHT, etc.

Figure 4:
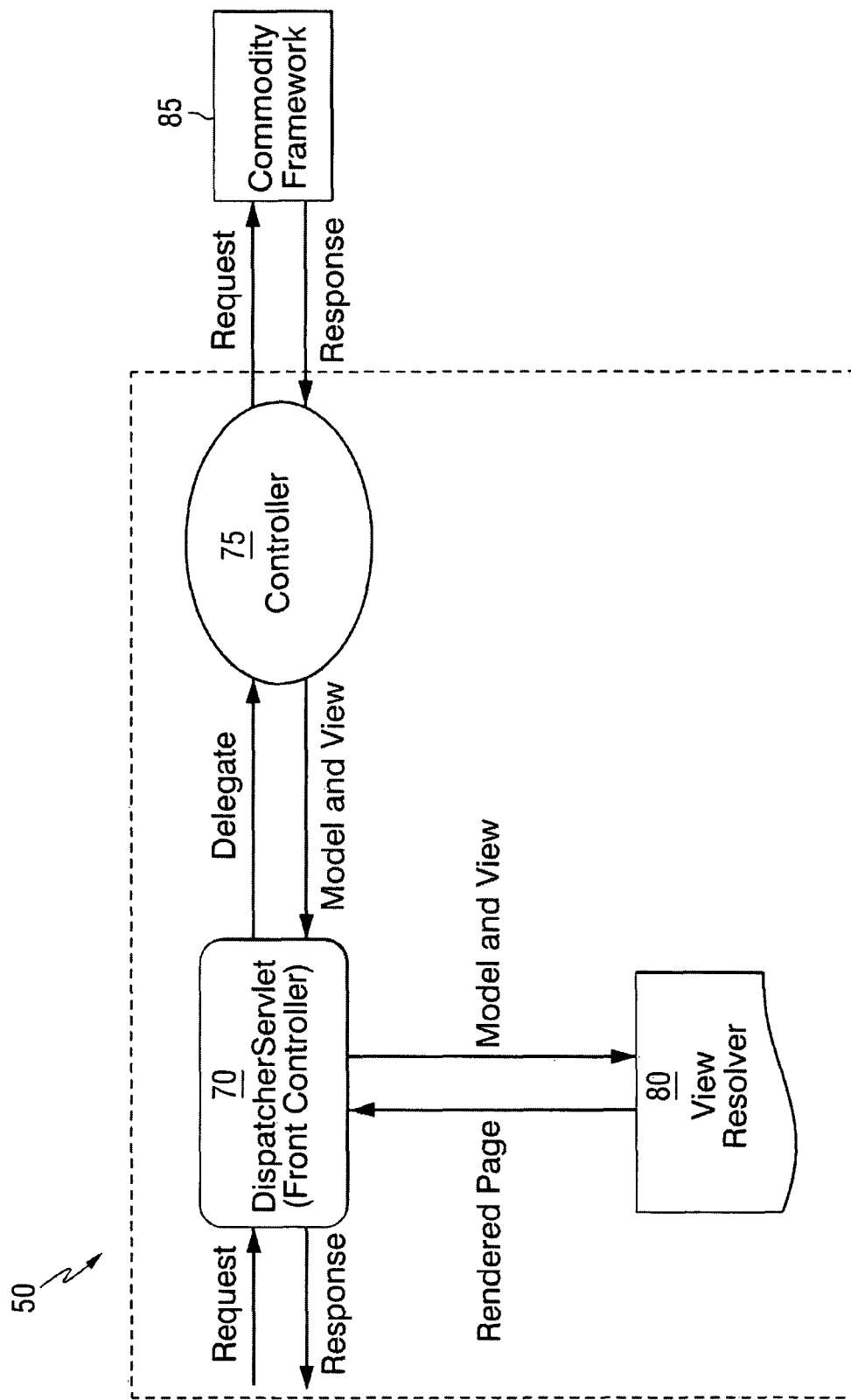
FIG. 4 illustrates an architectural framework of the web layer of FIG. 3 according to one embodiment.

The web layer 50 controls access to the application layer 55. In one embodiment, for example, the web layer 50 is implemented using the Spring model-view-controller (MVC) framework. According to such embodiments, and as shown in FIG. 4, the web layer 50 may comprise a front controller 70 (e.g., a DispatcherServlet) which may intercept, validate and enrich requests received from the user interface layer 45. Requests may subsequently be delegated to one or more controllers 75, which in turn communicate with the application layer 55 (e.g., with the commodity framework 85 discussed below in connection with FIG. 5) and fulfill each request by returning a corresponding model and view to the front controller 70. In various embodiments, the model and view may be defined in terms of a model-view-controller framework, such as the Spring MVC framework. For example, one commodity may represent a business card. The business card commodity may include data describing details of the subject including, for example, a name, a title, a photograph, a department or cost center, a phone number, an indication of whether the person is present in the office, etc. Constructing a model of the example business card commodity may comprise various tasks including, for example, formatting the data, organizing the data, finding derivative data from the returned data, requesting additional data where necessary, requesting updated time-dependent data, etc. From the front controller 70, the model and view may be communicated to a view resolver 80 to render the appropriate view (e.g., a JSP, AJAX, or XML/XSL view). The rendered view may then be routed by the front controller 70 to the requesting client 30 via the user interface layer 45. In certain embodiments, the Spring MVC framework may include validation functionality to perform server-side validations of requests (e.g., validation of person, group, search strings).

Figure 5:
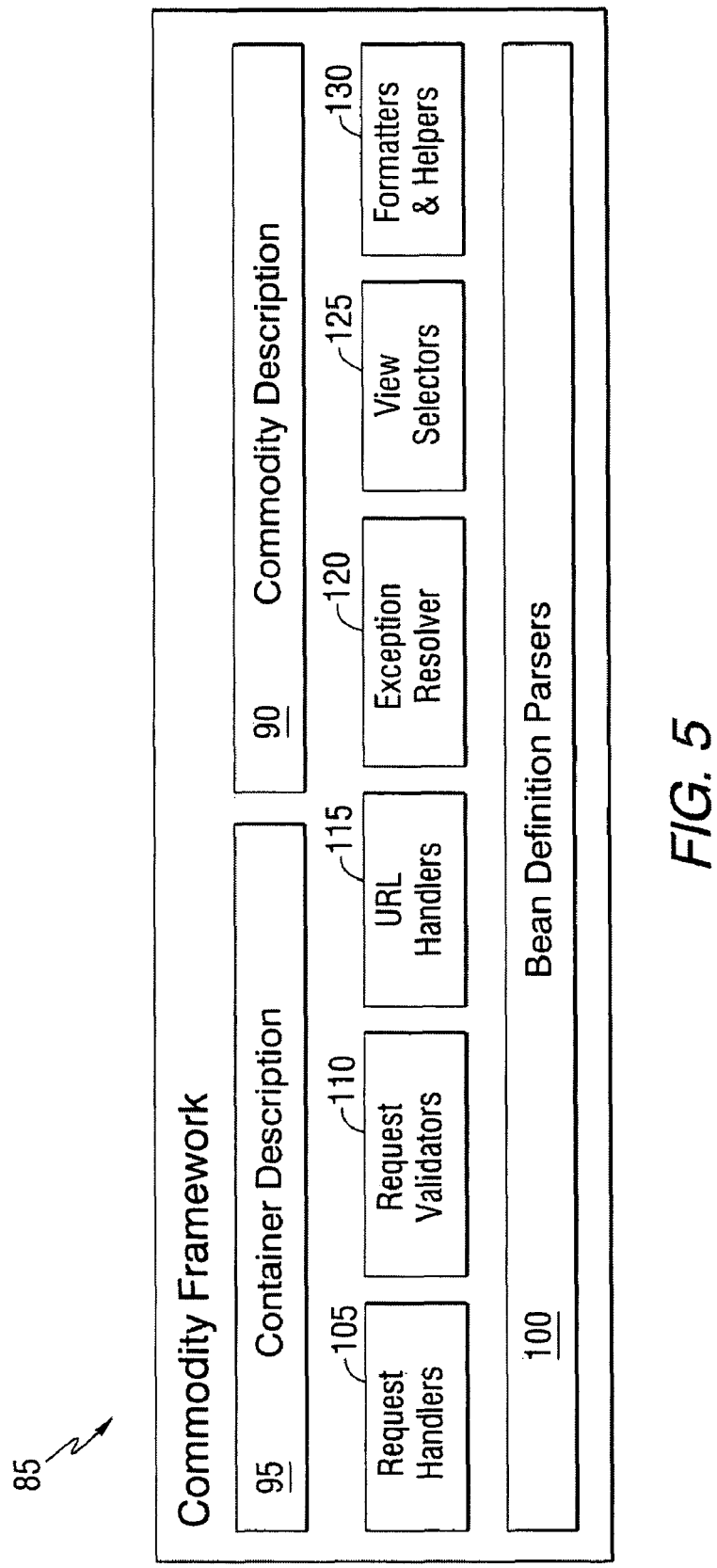
FIG. 5 illustrates the commodity framework of the application layer of FIG. 3 according to one embodiment.

The application layer 55 includes the commodity framework 85 (FIG. 5) and performs business processing aspects of the talent directory application. Logical components of the commodity framework 85 are illustrated in FIG. 5 and include a commodity descriptor 90 and a container descriptor 95. The commodity descriptor 90 may comprise one or more XML or similarly coded files that define the various commodities 15 that may be used for the web page profiles 5 of the talent directory application (e.g., the commodities of FIG. 1). For example, the commodity descriptor 90 may comprise the declarative definitions of one or more commodities 15.

Each commodity definition may specify events that define various actions (e.g., view, update, add, delete) associated with the commodity 15, along with the service components that are to process the business data required by or used by the commodity 15. Each event may also define a view describing the manner in which the commodity will be returned by the commodity framework, 85. For example, the view may indicate that business data making up the commodity 15 should be returned in a non-graphical data format such as, for example, XML or XSL. Also, for example, the view may indicate that business data making up the commodity 15 should be returned according to a graphical format such as, for example, HTML or JSP. In this way, a container or other web application requesting the commodity 15 may be able to specify whether it will receive the commodity in a pre-formatted graphical form or as raw data that may be used or formatted in any way. In embodiments where the commodity 15 is to be formatted according to JSP, the commodity descriptor 90 may further specify the particular JSP to be used for rendering the response, along with its location.

An XML definition of a commodity 15 entitled "BusinessCard" may be represented as follows:

```
<commodity id="BusinessCard">
  <event name="view">
    <service name="tmService" functions="queryTmBusinessCard" />
    <simpleViewSelector>
      <view type="default"
          name="commodity/BusinessCard/ViewBusinessCard"/>
    </simpleViewSelector>
  </event>
</commodity>
```

The BusinessCard commodity may be accessible by a unique Universal Resource Locator (URL). An example of such a URL is as follows:

http://directory.com/BFServices/tm/webapp/tm/BusinessCard/view.html?personId=268754

An explanation of the URL is provided at Table 1 below:

TABLE 1

| URL Component | Explanation |
|---|---|
| "directory.com" | The name of a server to which the URL points (e.g., the web server 25) |

TABLE 1-continued

| URL Component | Explanation |
|---|---|
| "BFServices" | A metaproject implemented by the server |
| "tm" | A project implemented by the server (e.g., classified under the metaproject) |
| "webapp" | An indication that the URL may call a web application |
| "tm" | A context name |
| "BusinessCard" | A name of the commodity referenced by the URL |
| "view" | A name of the event called in conjunction with the commodity |
| "personID" | An input parameter identifying the data that should be used to populate the commodity |

Another example XML definition of a commodity entitled "Certifications" is provided below:

```
<commodity id="Certifications">
  <event name="view">
    <service name="tmService"
functions="queryTmCertifications"/>
    <simpleViewSelector>
      <view type="default"
          name="commodity/Qualifications/ViewCertifications"/>
    </simpleViewSelector>
  </event>
  <event name="edit">
    <service name="tmService" functions="queryTmCertifications"
/>
    <simpleViewSelector>
      <view type="default"
          name="commodity/Qualifications/UpdateCertifications"/>
    </simpleViewSelector>
  </event>
  <event name="suggest">
    <service name="tmService" method="execute"
          functions="searchTmCertifications" />
    <ajaxViewSelector>
      <ajaxResponseName>
        <messageFormatter pattern="{0}"
directive="certifications"
                columns="certificationName" />
      </ajaxResponseName>
      <ajaxResponseValue>
        <messageFormatter pattern="{0}"
directive="certifications"
                columns="certificationId" />
      </ajaxResponseValue>
    </ajaxViewSelector>
  </event>
</commodity>
```

Here, the "commodity id" field specifies the name of the commodity 15. The "event" field defines the events or actions that may be taken with respect to the commodity 15. The "service" field specifies a services or business layer service (e.g., by name, "tmService," method, "execute" and function, "searchTMCertifications"). As described below, the identified business layer 60 service may generate and populate instances of the commodity according to the commodity definition. The name may specify a reference object or bean corresponding to the services layer 60 class. The method may specify a method of the services layer object that contains business logic for the commodity. The function may represent a business function that may be called by the commodity to query the database.

The "ViewSelector" fields under each event may specify the type of view that may be returned when the commodity is called with each particular event. For example, the "ViewSelector" fields may specify a JSP or other file defining an output view. It will be appreciated that some events may be configured to result in a static output view, while others may be configured to result in a dynamic output view. For example, the "edit" event results in a static view type, while the "suggest" event results in a dynamic view that may, for example, include calls to one or more asynchronous JavaScript and XML (Ajax) applications. It will be appreciated that commodity definitions may include various other fields. For example, parameter mapping fields may map parameters received in the content request (e.g., the personID parameter from the URL above) to corresponding parameter names used by the services layer 60. According to various embodiments, parameters may be defined with default values. This may obviate the need to define default parameter values at the page level (e.g., in HTML, JSP, etc.).

Referring back to FIG. 5, the container descriptor 95 may comprise one or more files defining various containers (e.g., the web page profile 5 of FIG. 1) available to the end user to view. Similar to the commodities described above, the containers may be defined in XML or a similar format. According to various embodiments, each container definition may refer to one or more commodities that are constituent parts of the container. For example, the web page profile 5 may have a container definition that identifies the various commodities 15 shown in FIG. 1. Container definitions may also describe layout properties for each container. According to various embodiments, each container may be accessible via a unique URL. A URL for an example container entitled "Qualification" is given below: http://directory.com/BFServices/tm/webapp/tm/container/Qualification.html?personID=268754 An explanation of the URL is provided at Table 2 below:

TABLE 2

| URL Component | Explanation |
| --- | --- |
| "directory.com" | The name of a server to which the URL points (e.g., the web server 25) |
| "BFServices" | A metaproject implemented by the server |
| "tm" | A project implemented by the server (e.g., classified under the metaproject) |
| "webapp" | An indication that the URL may call a web application |
| "tm" | A context name |
| "container" | Signifies that the URL refers to a container |
| "Qualification.html" | The name of the container being called |
| "personID" | An input parameter identifying the data that should be used to populate the commodity |

Example definitions for the "Qualification" container and a parent container entitled "ContainerBase" are below:

```
<container id="ContainerBase" abstract="true"
    tile-def=".PersonContainerLayout"/>
<container id="Qualification"
    titleKey="tm.container.qualification.title"
    parent="ContainerBase">
    <containerOutput>
        <commodityTarget id="viewResponsibilities"
            commodity="Responsibilities"
            event="view"/>
        <commodityTarget id="viewSME"
            commodity="SkillsExpertise" event="view"/>
        <commodityTarget id="viewEducation"
            commodity="Education" event="view"/>
        <commodityTarget id="viewCertifications"
            commodity="Certifications"
            event="view"/>
        <commodityTarget id="viewLanguages"
            commodity="Languages" event="view"/>
    </containerOutput>
</container>
```

Here, the "container" field defines the container. The "id" field specifies an identifier for extending the layout of similar pages. The "abstract" field may control viewability. For example, the "ContainerBase" container has an "abstract" field set to "true," which may indicate that the "ContainerBase" container may not be viewed. Instead, it may serve as a parent container for other containers such as the "Qualification" container. The "tile-def" field may specify a tile definition to use, which may define the physical placement of commodities and other container components. The "parent" field may identify a parent container, if any. For example, the "Qualification" container lists the "ContainerBase" container as its parent. The "commodityTarget" fields may list commodities and views that are to be displayed with the container. The "titleKey" field may list a title of the page of the container.

Another example container definition entitled, "PersonBase" is reproduced below:

```
<container id="PersonBase" abstract="true"
parent="ContainerBase">
    <containerInput>
        <parameter name="personId"/>
    </containerInput>
    <containerOutput>
        <commodityTarget id="viewBusinessCard"
commodity="BusinessCard" event="view"/>
            <containerTarget id="Search" container="QuickSearch">
                <parameterMapping from="searchTerm"
to="searchTerm" />
                <parameterMapping from="searchType"
to="searchType" />
            </containerTarget>
            <containerTarget id="Contact" container="Contact">
                <parameterMapping from="personId" to="personId"/>
            </containerTarget>
    </containerOutput>
</container>
```

The "PersonBase" container includes several additional features. For example, the "PersonBase" container comprises a "containerInput" field defining inputs that are received by the container. Also, under the "containerOutput" field, the example "PersonBase" container includes other containers that are part of its output view.

As shown in FIG. 5, the logical components of the commodity framework 85 may further include a definition parser component 100, a request handling component 105, a request validation component 110, a URL handling component 115, an exception resolution component 120, a view selection component 125, and a formatters and helpers component 130. Functions of each of these components are described below.

The commodity framework 85 includes defined custom XML authoring for defining and configuring objects to extend the object configuration of the web layer 50. For example, when JAVA is used, the objects may be JAVABEANS. To enable custom object definitions, the commodity framework 85 may comprise a definition parser component 100, which may be configured to parse the custom object definitions, create objects, and to make the created objects available in the application context. In this way, the commodity framework 85 may have functionality for creating new objects (e.g., commodities, containers, etc.).

The request handlers 105 and request validators 110 may comprise functionality for handling and validating requests for commodities or containers. For example, a commodity request received by the commodity framework 85 may specify the URL of the desired commodity. A request handler 105 (e.g., a commodity request handler) may parse the request URL to identify the requested commodity and event. A request validator 110 may then validate the existence of the requested commodity and event. If the requested commodity and/or event does not exist, an exception is generated. The request handling component 105 may also assist in connection with fetching the commodity object based on the commodity name. Similar request handling and request validation components may be used to handle containers 10. In certain embodiments, the URL handler 115 may assist in connection with URL parsing and may additionally generate URL's identifying target objects specified in the commodity and container descriptors 90, 95. For example, when a container comprises a target commodity, the URL handler 115 may generate a URL for the commodity.

A view selector 125 may operate to generate the view a requested commodity based on, for example, a "view" parameter included in the definition of a particular commodity and described above. The commodity framework 85 may include view selection components to support various types of views, such as, for example, a SimpleViewSelector may support static views while an AjaxViewSelector or other selector may support dynamic views. In certain embodiments, for example, the selected view may be processed by the formatters and helpers component 130, which may define a number of formatter classes to format the selected view prior to being returned to the web layer 50.

The exception resolver component 120 may comprise functionality for handling exceptions generated in the commodity framework 85. For example, when an exception is encountered in response to a content request (e.g., a request for a container or a commodity), the commodity framework 85 may return a predetermined exception view in place of the requested container or commodity. According to various embodiments, exceptions may be organized into various exception classes, where different exceptions return different exception views. A general exception may be a base exception for other specific exceptions in the framework 58. A container exception may be specific to container components of the framework 85. For example, a container exception may be generated when a request handler 105 and/or validator 110 determines that a requested container does not exist. A commodity exception may be specific to commodity components of the framework 85. For example, a commodity exception may be generated if a request handler 105 and/or validator 110 determines that a requested commodity does not exist, or that the requested commodity does not define the requested event. A service exception may be an exception that originates at a component that is logically below the commodities framework 85. For example, a service exception may be generated at the services layer 60 as a service attempts to populate a commodity. In certain embodiments, custom exception handlers and pages may be defined (e.g., by the definition parser 100). For example, pages may be defined declaratively as part of a commodity definition using an event type of "exception."

According to various embodiments, a commodity or container may be defined to be accessible in an alternate or "lite" context. When the commodity or container is accessed in the alternate context, the behavior of the commodity or certain features may be modified and/or unavailable. For example, in one alternate context, a commodity or container may access data through a Lightweight Directory Application Protocol (LDAP) connection instead of from a local data source. This may be useful if the local data source is down. Also, for example, login functionality for certain functions may be disabled when a commodity or container is accessed according to the alternate context. This may be useful, for example, to implement security policy.

Referring again to FIG. 3, the services layer 60 may separate the application layer 55 from the data access layer 65 and contain business components and logic to support the commodity framework 85. For example, the services layer 60 may comprise the various services that are specified within the descriptors 90, 95 to implement various commodities and/or containers. The functionalities of the services layer 60 to be invoked are determined by, for example, the particular service/business class and function defined in connection with a particular commodity 15.

The data source access layer 65 communicates with the one or more data sources 40 responsive to functions invoked within the services layer 60. In certain embodiments the data source access layer 65 includes a lightweight service framework to build business-focused functions and commodities, and to enable their delivery as open services. The service framework maps business principles with commodities. This may enable building business-focused deliverables quickly and with the ability to extend its usage and principles with quick time to market. The service framework may include one or more of the following core components: a policy/entitlement check layer, an orchestrator layer, and a data access layer.

In certain embodiments, the orchestrator layer includes one or more orchestrator components. The orchestrator components provide high-level abstraction for loading the data by defined predicates. Additionally, the orchestrator components may hide all the details of communication to external entities. The contract between the service framework and an orchestrator component to be used may be defined, for example, in an XML description of service framework models. In certain embodiments, different types of orchestrator components, such as, for example, a data source orchestrator component, a LDAP orchestrator component, and a Verity components orchestrator component, may be used. Because the orchestrator components define a hand shake, a number of underlying implementations may be provided that, in turn, may be used to communicate with different sources.

Figure 3A:
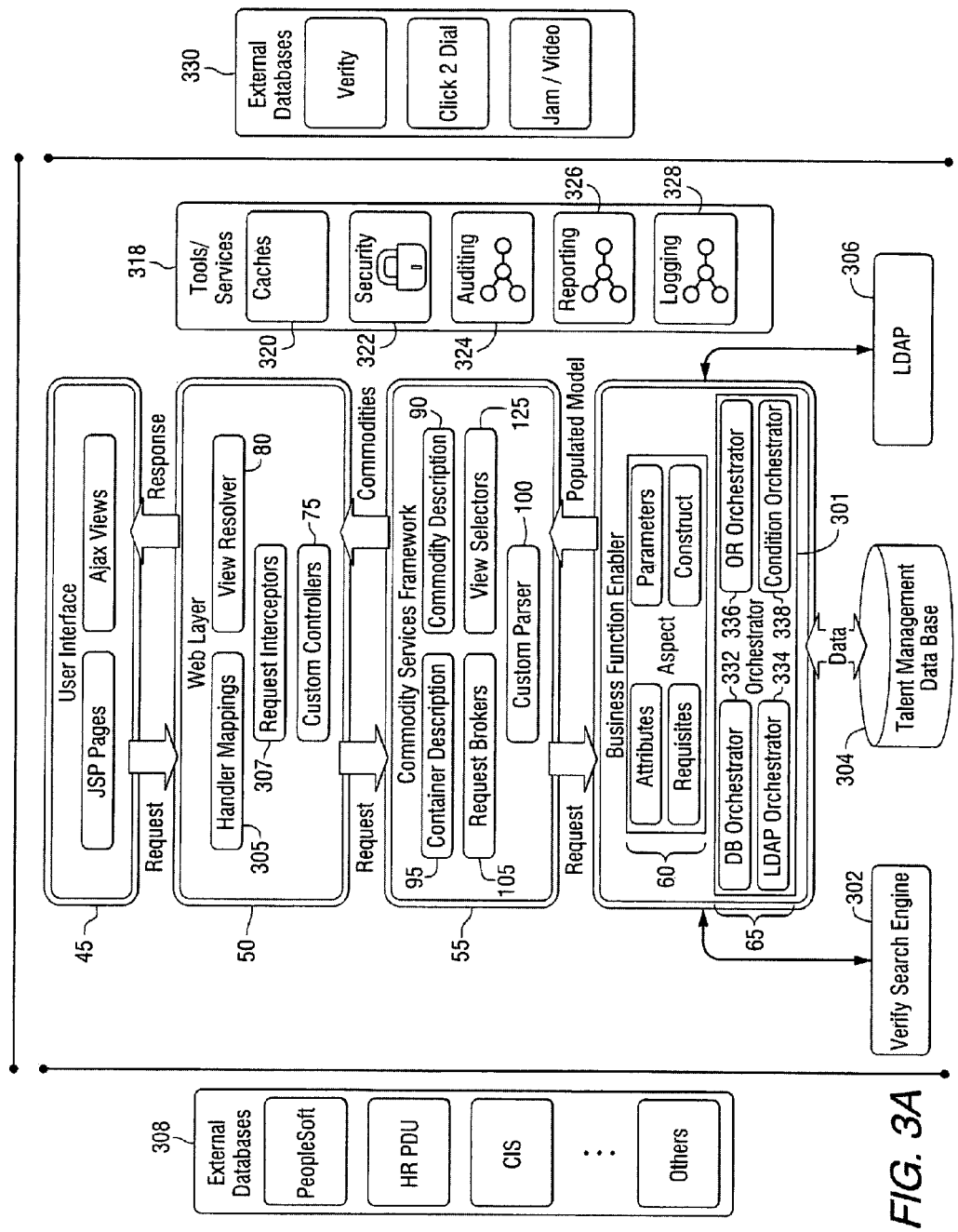
FIG. 3A illustrates the logical architecture of FIG. 3 according to various embodiments.

FIG. 3A illustrates the logical architecture of FIG. 3, according to various embodiments, including different/additional components. For example, the front controller 70 of the web layer 50 (FIGS. 3 and 4) is illustrated in FIG. 3A as two components, a request interceptor 307 for receiving requests from the user interface layer 45 and a handler mapping 305 for directing the requests to the appropriate controller 75. Various components of the orchestrator 301 are illustrated in FIG. 3A including, for example, the data source orchestrator 332 and the LDAP orchestrator 334. Additional orchestrators 336, 338 for accessing additional types of services and data sources are also provided.

FIG. 3A also illustrates internal and external systems, data sources and devices accessed by the data access layer 65. A system-specific data source 304 may include data that is specific to the systems being implemented with the commodity services framework 55. In the example given, this may be a talent management data source. An LDAP connector 306 may allow the system to access various services and data source utilizing the LDAP protocol. A search engine interface 302 may allow the system to utilize various search engines to access additional data. The interfaces 306, 302, as well as other interfaces known in the art, may provide the system with access to various external data sources 308 and systems 330. External data sources 308 that may be accessible may include, for example, human resources data sources, customer information system data sources, etc. External systems may include those of external personnel information providers, such as VERITY, telephone information providers such as CLICK2DIAL, video providers, etc.

Figure 6:
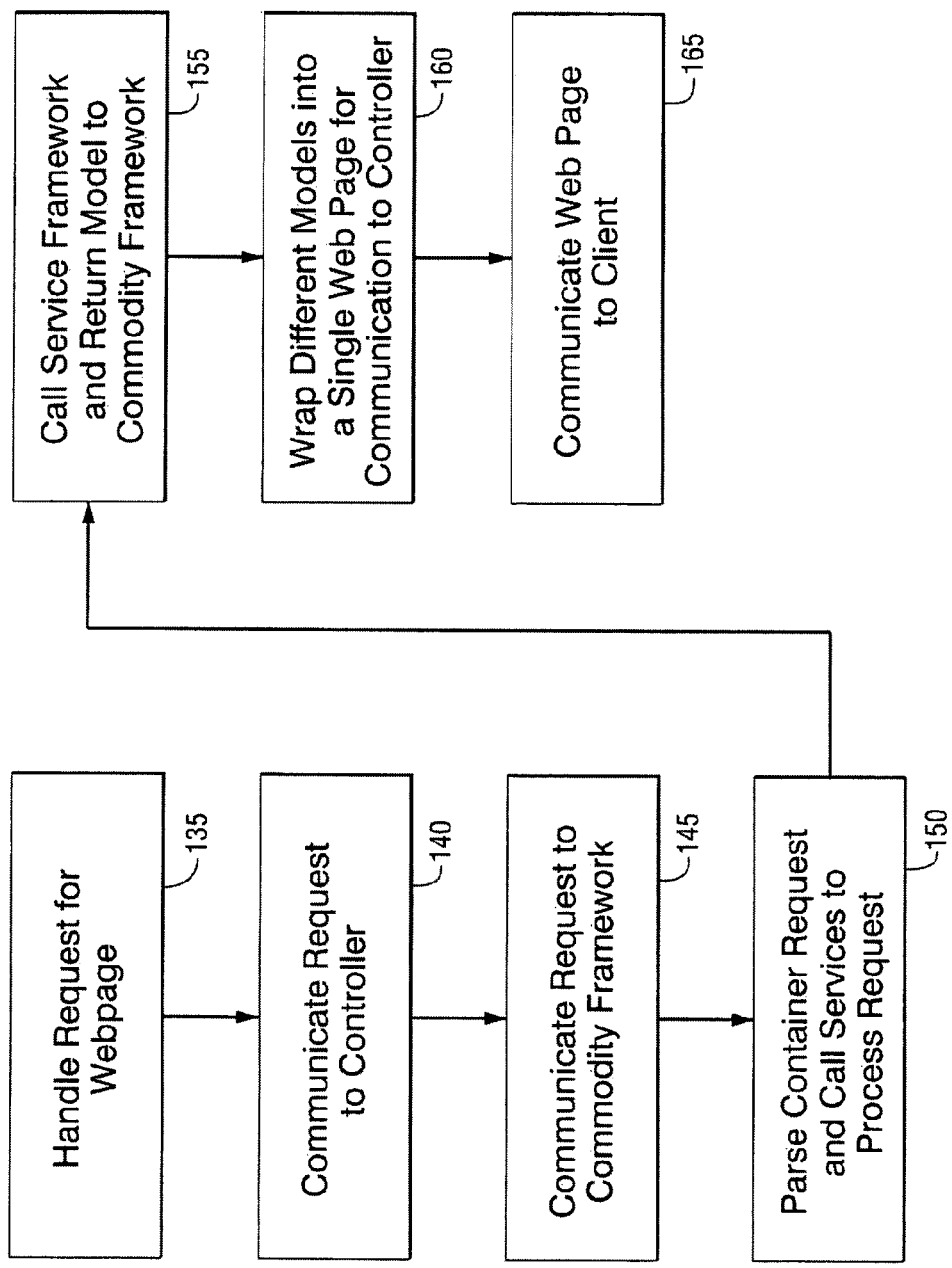
FIG. 6 is a process flow of interactions between layers of FIG. 3.

FIG. 6 is a process flow of the interactions between the layers of FIG. 3. At step 135, the Spring Dispatcher Servlet handles a request for a web page. At step 140, the Spring Dispatcher Servlet communicates the request to an appropriate controller of the web layer 50 based on mapping defined in a context file. At step 145, the controller 75 communicates the request to the commodity framework 85. At step 150, the commodity framework 85 parses the request and calls one or more services necessary to process the request. At step 155, the one or more services call the service framework and return a model to the commodity framework 85. According to various embodiments, the service may merely return data describing the commodity, allowing the commodity framework to construct the model. At step 160, the commodity framework 85 may wrap different models into a single page and communicates the page to the controller 75 of the web layer 50. At step 165, the web page is communicated to the server 25.

Figure 7:
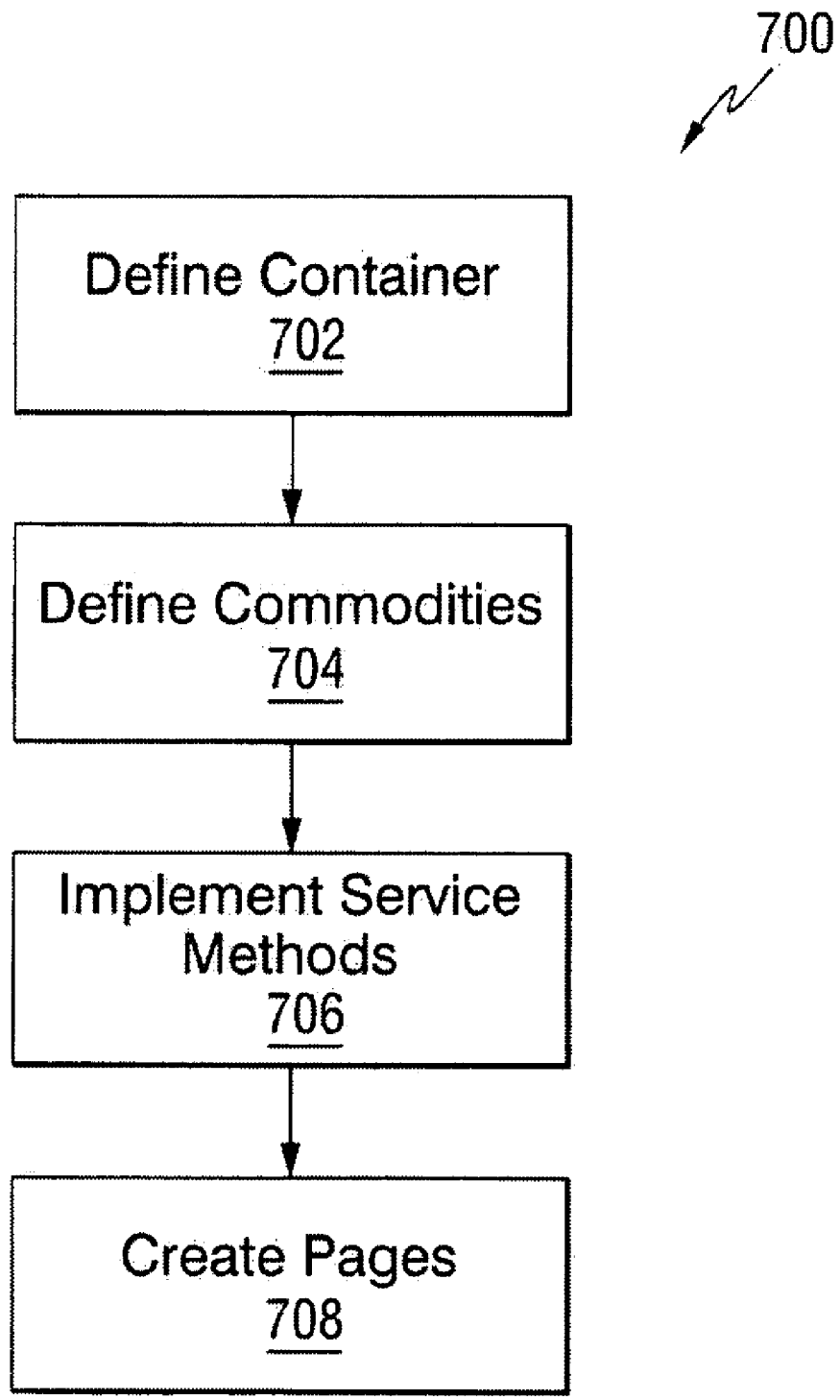
FIG. 7 is process flow 700 for generating a web page profile using the commodity framework disclosed herein according to one embodiment.

FIG. 7 illustrates one embodiment of a process flow 700 for generating a web page profile, such as the web page profile 5 of FIG. 1, using the commodity framework disclosed herein. At box 702, a developer may define a container for the web page profile. Code XML code) defining the container may be included in the container descriptor 95 as a stand-alone file or as a part of another (e.g., pre-existing) file. At box 704, the developer may define any commodities declared by the container definition. For example, the commodities may be defined by code (e.g., XML code), which may be included in the commodity descriptor 90, again as a stand-alone file or as part of another file. According to various embodiments, some of the commodities declared by the container definition may be pre-existing commodities. Accordingly, some or all of box 704 may be optional. At box 706, the developer may implement any service methods declared by the commodities and the container that are not pre-existing. The service methods may be implemented at the services layer 60 and may be coded according to any suitable format or programming language. Additionally, the developer may develop view pages, as required, for the commodities. The view pages may be in any suitable format including, for example, JSP pages. Upon execution of the commodities, the view pages may be populated with data retrieved by the service methods.

Figure 8:
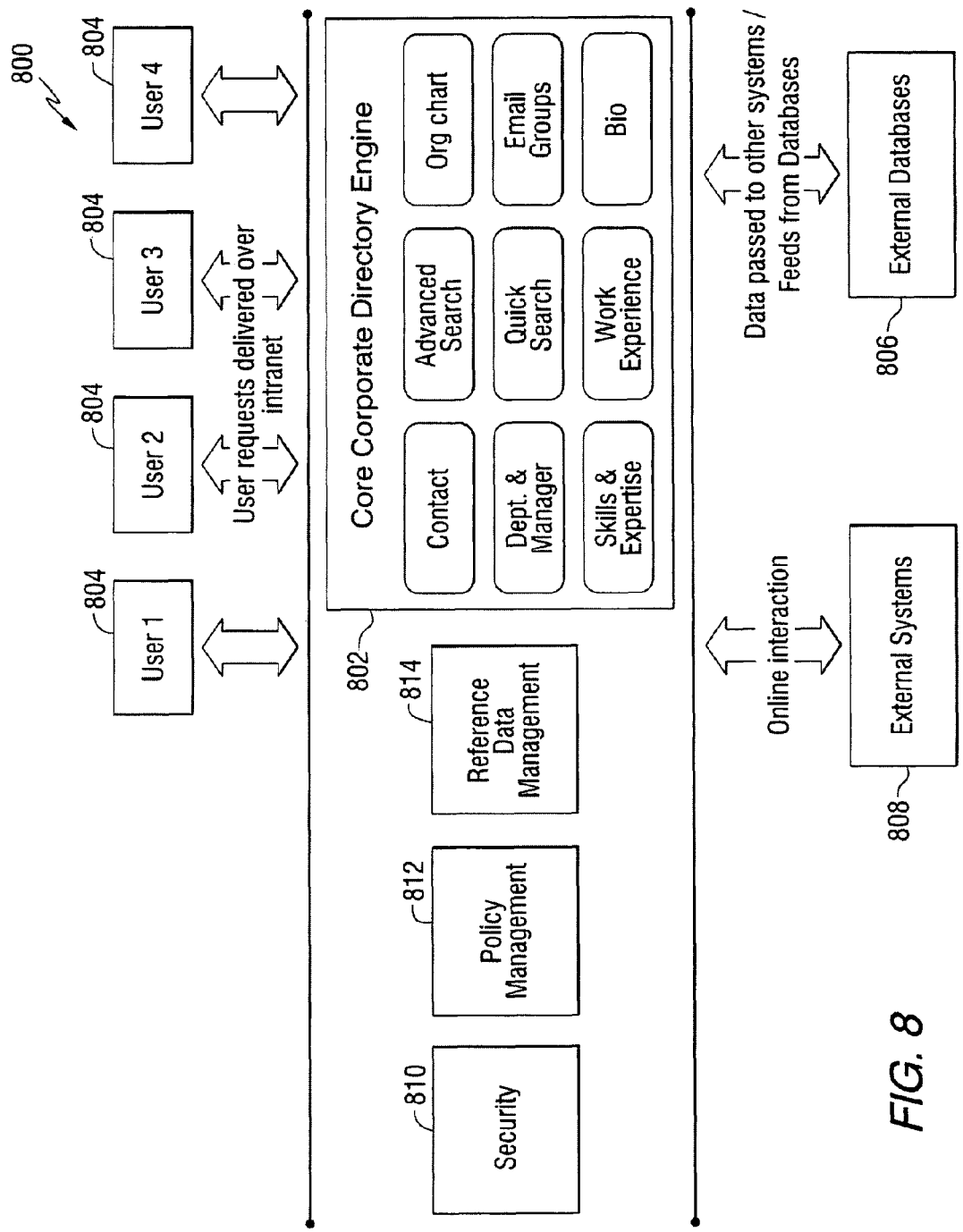
FIG. 8 is a functional diagram illustrating one embodiment of a talent directory system implemented within an organization utilizing the commodities framework described herein.

FIG. 8 is a functional diagram illustrating one embodiment of a talent directory system 800 implemented within an organization utilizing the commodities framework described herein. The system 800 may be implemented, for example, by a system similar to the system 20 described with reference to FIG. 2. A core corporate and/or talent directory engine 802 may receive requests for personnel-content from users 804. The engine 802 may retrieve the content from internal data sources (not shown) or from external data sources 806 and/or systems 808. For various employees, the engine 802 may provide contact information, an employee's department and manager, an employee's skills and expertise, an employee's work experience, an organizational chart including the employee, biographical information about the employee, e-mail groups to which the employee belongs, etc. In addition, the engine 802 may comprise search features for locating employees by various characteristics. For example, a simple search may allow a user 804 to search for employees according to a limited set of parameters. An advanced search may allow a user 804 to search for employees with an expanded set of parameters.

A security application 810 and policy management application 812 may implement authorization and authentication functions for ensuring that users 804 are identified and given access to a proper level of functionality of the engine 802. For example, employees of the organization may be given a higher level of access than non-employees. Similarly, management employees may be given a higher level of access than non-management employees. A reference data management application 814 may manage the engine's 802 access to employee data.

Figure 9:
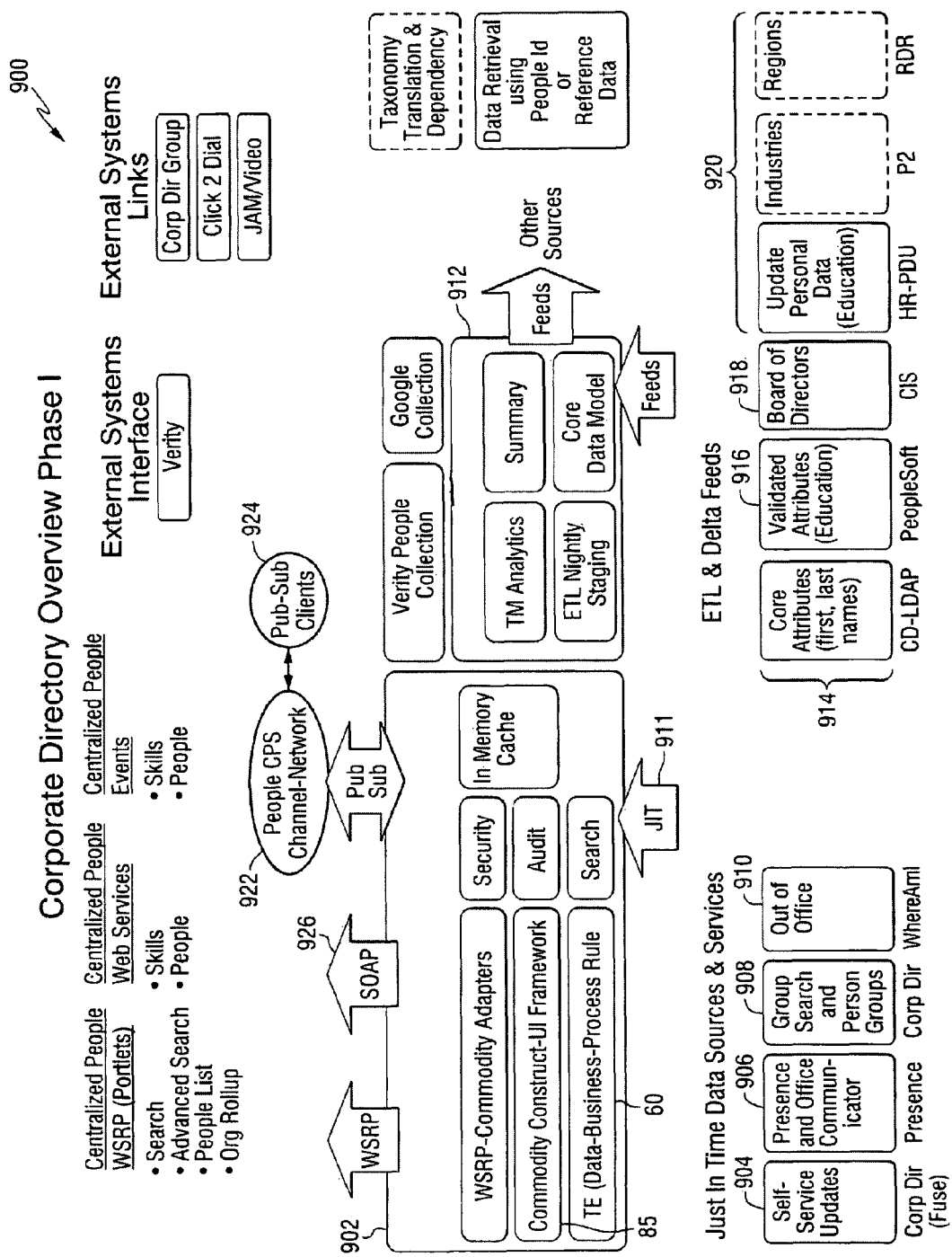
FIG. 9 is a chart of a directory system implemented with a commodities framework as described herein.

FIG. 9 is a chart of a directory system 900 implemented with a commodities framework as described herein. The directory system 900 may be a corporate directory and/or a talent directory listing the talents/skills of individuals. The commodities services framework 902 may be similar to the framework described above with respect to FIGS. 1 and 2. For example, the framework 902 may comprise a commodity framework 85 and a services layer 60. The services layer 60 may have access to multiple different data sources. The data sources may comprise corporate directories 908, 910. Various services, such as a "presence and office communicator" service 906 and a "where am I" service 910 may return information regarding employees that may be utilized by some commodities. Additional data sources and services may be available through a people reference data system 912. The people reference data system 912 may be in electronic communication with various data sources and services including, for example, a core attributes data source, a human resources data source 916, a customer information system (CIS) data source 918, and various other data sources 920 that may comprise different information regarding employees. The human resources data source 916 may be any suitable proprietary or commercially available data source. It will be appreciated that the various data sources and services may be accessed according to any suitable manner. For example, various data sources and services may be accessible via a just-in-time (JIT) interface 911. Some sources, such as the data source 914, may be accessed according to a LDAP connection.

The framework 902 may provide web page profiles as outputs to users (e.g., users 804) using any suitable mechanism. For example, a publication/subscription service (Pub/Sub) 922 may push web page profiles to pub/sub subscribers 924. Also, an interface 926 may provide web page profiles to various applications. The interface 926 maybe coded in any suitable format including, for example, simple object access protocol (SOAP), Representation State Transfer (REST). Likewise, a web services for remote portlets (WSRP) may provide an interface for applications supporting this capability.

It will be appreciated that the above-described embodiments are provided by way of example only, and that use of the commodity framework 85 is not limited to a talent directory application. Rather, it will be understood that the commodity framework 85 provides an attractive alternative to portal-based web applications generally in terms of complexity, scalability, and functionality. In particular, because the server 25 of the system 20 may be implemented using conventional and well-established server infrastructures and technologies, development and deployment costs are reduced relative to portal-based approaches. Additionally, the amount of code required to implement the various server functionalities (e.g., the functionalities of the layers of FIG. 3, for example) may be significantly less than that required for portal-based applications. Accordingly, web applications based on the commodity framework 85 are lightweight and faster relative to portal-based approaches, thus enhancing scalability. Moreover, the commodities 15 may not be limited to being exposed through the commodity framework 85, but may also be rendered by external applications using a number of different technologies. In certain embodiments, the external application may have its own container 10 and may communicate with the server 25 to request one or more commodities 15 in a data-based format (e.g., an XML format). In other embodiments, the external application may communicate to the server 25 to request presentation of one or more commodities 15 assembled in a container 10. Such flexibility is not available using portal-based solutions.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and, therefore, a more detailed description of such elements is not provided herein.

Any element expressed herein as a means for performing a specified function is intended to encompass any way of performing that function, including, for example, a combination of elements that performs that function. Furthermore, the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more propagated computer-readable media.

Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media. In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A system for presenting an interface to a user, the system comprising:
a data source comprising data associated with a plurality of commodities comprising a first commodity; and
at least one server in electronic communication with the data source, the at least one server comprising at least one processor and an operatively associated computer readable medium, wherein the computer readable medium comprises instructions thereon that, when executed by the at least one processor, causes the at least one server to execute:
a commodity framework layer for:
receiving a request for content originating from an application executing on a client machine in electronic communication with the at least one server, wherein the request identifies the first commodity and a first event associated with the commodity, wherein the request comprises a Universal Resource Locator (URL) identifying the first commodity, and wherein the URL specifies a name of the first commodity and a name of the first event associated with the commodity;

parsing a commodity descriptor file to identify a definition of the first commodity, wherein the commodity descriptor file comprises definitions of the plurality of commodities, and wherein the definition of the first commodity comprises:

definitions for a plurality of services, wherein the plurality of services are to process data for the first commodity;

definitions for a plurality of events including the first event, wherein each definition for an event defines a view describing a manner in which the first commodity will be returned and a service selected from the plurality of services associated with the event;

generating a service call requesting a first service associated with the first commodity and the first event by a definition of the first event;

in response to the service call, receiving from the first service data describing the commodity; and constructing a model of the commodity according to the data and according to a view defined by the definition of the first event.

2. The system of claim 1, wherein the application is a browser application.

3. The system of claim 1, wherein the computer readable medium comprises instructions thereon that, when executed by the at least one processor, causes the at least one server to execute a business layer in communication with the commodity framework, wherein the business layer is for:

receiving the service call from the commodity framework; and executing the at least one service associated with the first commodity and the first event, wherein the at least one service is for querying the data source to retrieve the data describing the commodity.

4. The system of claim 3, wherein the at least one service is also for generating a view of the commodity, wherein the view defines at least one of a graphical format for the commodity and a non-graphical format for the commodity.

5. The system of claim 4, wherein the non-graphical format is XML and the graphical format is HTML.

6. The system of claim 3, wherein the computer readable medium may further comprise instructions thereon that, when executed by the at least one processor, causes the at least one server to execute a web layer framework application for:

receiving the model of the commodity from the commodity framework layer; and rendering a graphical representation of the commodity based on the view and the model of the commodity.

7. The system of claim 3, wherein the view of the commodity is based on a view definition associated with the first commodity at the commodity descriptor file.

8. The system of claim 7, wherein first event identifies the view definition.

9. The system of claim 1, wherein the definition of the first commodity at the commodity descriptor file defines at least a first graphically formatted view for the first commodity and a second data formatted view.

10. The system of claim 1, wherein the at least one server comprises a first server for handling requests for static content and a second server for handling requests for dynamic content.

11. The system of claim 1, wherein the commodity framework layer is also for:

parsing the URL to derive the first commodity and the first event; and validating the existence of the first event by determining whether the first event is defined for the first commodity at the commodity descriptor file.

12. The system of claim 1, wherein the computer readable medium comprises instructions thereon that, when executed by the at least one processor, causes the at least one server to execute a request validator for validating the existence of the first commodity.

13. A method for presenting an interface to a user, the method comprising:

receiving by a computer a request for content originating from an application executing on a client machine in electronic communication with the computer, wherein the request identifies a first commodity and a first event associated with the commodity, wherein the request comprises a Universal Resource Locator (URL) identifying the first commodity, wherein the URL specifies a name of the first commodity and a name of the first event associated with the commodity, and wherein the computer comprises at least one processor and operatively associated memory;

parsing by the computer a commodity descriptor file to identify a definition of the first commodity, wherein the commodity descriptor file comprises definitions of a plurality of commodities, and wherein the definition of the first commodity comprises:

definitions for a plurality of services, wherein the plurality of services are to process data for the first commodity;

definitions for a plurality of events including the first event, wherein each definition for an event defines a view describing a manner in which the first commodity will be returned and a service selected from the plurality of services associated with the event;

generating by the computer a service call requesting a first service associated with the first commodity and the first event by a definition of the first event;

in response to the service call, receiving from the first service data describing the commodity; and constructing a model of the commodity according to the data and according to a view defined by the definition of the first event.

14. The method of claim 13, wherein the application is a browser application.

15. The method of claim 13, further comprising executing by the computer the at least one service associated with the first commodity and the first event, wherein the at least one service is for querying the data source to retrieve data describing the commodity.

16. The method of claim 13, further comprising generating a view of the commodity, wherein the view defines at least one of a graphical format for the commodity and a non-graphical format for the commodity.

17. The method of claim 16, wherein the graphical format is HTML and the non-graphical format is XML.

18. The method of claim 16, wherein the view of the commodity defines a graphical format for the commodity, further comprising rendering a graphical representation of the commodity based on the view and the model of the commodity.

19. The method of claim 13, further comprising validating the existence of the first commodity.

20. A system for presenting an interface to a user, the system comprising:
- a data source comprising data associated with a plurality of containers comprising a first container and a plurality of commodities; and
- at least one server in electronic communication with the data source, the at least one server comprising at least one processor and an operatively associated computer readable medium, wherein the computer readable medium comprises instructions thereon that, when executed by the at least one processor, causes the at least one server to execute:
  - a commodity framework layer for:
    - receiving a request for content originating from an application executing on a client machine in electronic communication with the at least one server, wherein the request identifies the first container, and wherein the request comprises a Universal Resource Locator (URL) identifying the first container;
    - parsing a container descriptor file to identify a first commodity selected from the plurality of commodities and a first commodity event associated with the first container;
    - parsing a commodity descriptor file to identify a definition of the first commodity, wherein the commodity descriptor file comprises definitions of a plurality of commodities, and wherein the definition of the first commodity comprises:
      - definitions for a plurality of services comprising a first service, wherein the plurality of services are to process data for the first commodity;
      - definitions for a plurality of events including the first commodity event, wherein each definition for an event defines a view describing a manner in which the first commodity will be returned and a service selected from the plurality of services;
    - generating a service call requesting the first service, wherein the first service is associated with the first commodity and the first commodity event by a definition of the first commodity event;
    - in response to the service call, receiving from the first service data describing the commodity; and
    - constructing a model of the container according to the data and according to a view defined by the first commodity event.

21. The system of claim 20, wherein the application is a browser application.

22. The system of claim 20, wherein the computer readable medium comprises instructions thereon that, when executed by the at least one processor, causes the at least one processor to execute a business layer in communication with the commodity framework, wherein the business layer is for:
- receiving the service call from the commodity framework; and
- executing the at least one service associated with the first commodity and the first commodity event, wherein the at least one service is for querying the data source to retrieve the data describing the commodity.

23. The system of claim 22, wherein the at least one service is also for generating a view of the container, wherein the view defines at least one of a graphical format for the commodity and a non-graphical format for the commodity.

24. The system of claim 22, wherein the non-graphical format is XML and the graphical format is HTML.

25. The system of claim 22, wherein the at least one server is further programmed to execute a web layer framework application for:
- receiving the model of the container from the commodity framework layer; and
- rendering the graphical representation of the container based on a view and the model of the container.

26. The system of claim 20, wherein the computer readable medium comprises instructions thereon that, when executed by the at least one processor, causes the at least one server to return the model in a data format in response to the request for content.

27. The system of claim 20, wherein the computer readable medium comprises instructions thereon that, when executed by the at least one processor, causes the at least one server to:
- parse the container descriptor file to determine a parent container to the first container; and
- retrieve a second container descriptor file associated with the parent container;
- incorporating at least one of a commodity identified at the second container descriptor file and an event identified at the second container descriptor file into the container model.

28. A system for presenting an interface to a user, the system comprising:
- a data source comprising data associated with a plurality of containers and a plurality of commodities; and
- at least one server in electronic communication with the data source, the at least one server comprising at least one processor and an operatively associated computer readable medium, wherein the computer readable medium comprises instructions thereon that, when executed by the at least one processor, causes the at least one server to execute:
  - a commodity framework layer for:
    - receiving a request for content originating from a browser application executing on a client machine in electronic communication with the at least one server, wherein the request identifies a first container, and wherein the request comprises a Universal Resource Locator (URL) identifying the first container;
    - parsing a container descriptor file to identify a first commodity and a first commodity event associated with the first container;
    - parsing a commodity descriptor file to identify a definition of the first commodity, wherein the commodity descriptor file comprises definitions of a plurality of commodities wherein the plurality of commodities comprises the first commodity, and wherein the definition of the first commodity comprises:
      - definitions for a plurality of services comprising a first service, wherein the plurality of services are to process data for the first commodity;
      - definitions for a plurality of events including the first commodity event, wherein each definition for an event defines a view describing a manner in which the first commodity will be returned and a service selected from the plurality of services;
    - generating a service call requesting the first service, wherein the first service is associated with the first commodity and the first commodity event by a definition of the first commodity event;
    - in response to the service call, receiving data describing the commodity; and constructing a model of the container according to the data and according to a view defined by the first commodity event; and a business layer in communication with the commodity framework layer, the business layer for executing the first service, wherein the first service is for querying the data source to retrieve data describing the commodity.

* * * * *